US007757687B2

(12) United States Patent
Liu et al.

(10) Patent No.: US 7,757,687 B2
(45) Date of Patent: Jul. 20, 2010

(54) SOLAR AIR CONDITIONING APPARATUS

(75) Inventors: Tay-Jian Liu, Taipei Hsien (TW);
Xin-Jian Xiao, Shenzhen (CN)

(73) Assignees: Fu Zhun Precision Industry (ShenZhen) Co., Ltd., Shenzhen, Guangdong Province (CN); Foxconn Technology Co., Ltd., Tu-Cheng, Taipei Hsien (TW)

(*) Notice: Subject to any disclaimer, the term of this patent is extended or adjusted under 35 U.S.C. 154(b) by 411 days.

(21) Appl. No.: 11/964,817

(22) Filed: Dec. 27, 2007

(65) Prior Publication Data

US 2009/0165483 A1  Jul. 2, 2009

(51) Int. Cl.
*F24J 2/24* (2006.01)
*F24J 2/04* (2006.01)

(52) U.S. Cl. .................. 126/628; 126/62; 126/629; 126/705; 126/658; 52/57; 52/730.3

(58) Field of Classification Search .................. 126/628, 126/705, 658, 629, 634; 52/57, 94, 173.3
See application file for complete search history.

(56) References Cited

U.S. PATENT DOCUMENTS

| | | | | |
|---|---|---|---|---|
| 4,222,373 A | * | 9/1980 | Davis | 126/664 |
| 4,316,452 A | * | 2/1982 | Levine | 126/664 |
| 4,426,999 A | * | 1/1984 | Evans et al. | 126/669 |
| 4,607,616 A | * | 8/1986 | Lehmann | 126/669 |
| 6,694,692 B2 | * | 2/2004 | Piccone | 52/426 |
| 6,880,553 B2 | * | 4/2005 | Liu et al. | 126/628 |
| 7,484,507 B2 | * | 2/2009 | Nikiforov et al. | 126/628 |

* cited by examiner

*Primary Examiner*—Steven B McAllister
*Assistant Examiner*—Nikhil Mashruwala
(74) *Attorney, Agent, or Firm*—Jeffrey T. Knapp

(57) ABSTRACT

A solar air conditioning apparatus includes an inlet assembly (20), an outlet assembly (30), a solar collector assembly (10), connecting assemblies (50) and joining members (40). The solar collector assembly includes a plurality of parallel connected solar collectors (11) disposed between inlet units (22) of the inlet assembly and outlet units (32) of the outlet assembly. The solar collector includes a plurality of series connected solar collecting units (12). The solar collecting unit has a bottom plate (12d), a heat-absorbing plate (12f), a brace plate (12g) and a transparent panel (12a). The bottom plate and the heat-absorbing plate respectively have first and second fastening structures (123, 124) and first and second clasping structures (121, 122) for joining the solar collecting units together. The connecting assemblies series connecting the solar collecting units, the inlet and the outlet assemblies. The joining members parallel connecting the inlet units and the outlet units.

15 Claims, 15 Drawing Sheets

SOLAR AIR CONDITIONING APPARATUS

CROSS-REFERENCES TO RELATED APPLICATIONS

This application is related to co-pending U.S. patent application Ser. No. 11/776,906 filed on Jul. 26, 2007 and entitled "SOLAR AIR CONDITIONER"; and co-pending U.S. patent application entitled "SOLAR AIR CONDITIONER" and filed in the same day as the instant application. The co-pending U.S. patent applications are assigned to the same assignee as the instant application. The disclosures of the above-identified applications are incorporated herein by reference.

BACKGROUND OF THE INVENTION

1. Field of the Invention

The present invention relates to air conditioning devices, and particularly, to an air conditioning device using solar energy to heat air.

2. Description of Related Art

With increasing $CO_2$ emissions, the risk of global climate becomes abnormal and ecological destruction may increase. As a result, industrialized countries have again become aware of the urgency to reduce their dependence on fossil fuels after the energy crisis in the 70's. Therefore, it has become important to develop new environmental friendly energy resources, and to replace devices using non-renewable energy resources, such as air-conditioners, with devices using renewable energy. The conventional air conditioning devices not only need more energy, but also require refrigerant which can be harmful to the environment. Consequently, these countries have given positive commitments to use solar energy more effectively. Though people still have reservations about whether solar energy will be able to replace other energy resources in the near future, one thing that is almost certain is that solar energy will be playing a very important role in a number of fields, especially air ventilation and heating in structures such as buildings and vehicles.

As far as an air conditioning device using solar energy for heating and air ventilation is concerned, solar collectors are a key part in such a device, and it has to be mounted at an outside location where sufficient sunlight can be collected, such as on a roof or wall. In the past, a lot of effort has been made to develop solar collectors with different functions and styles. Many of them have been disclosed in patent literature. The most typical example is fixing a glass panel or transparent panel onto a fixed outer frame of a heat-insulated chamber and passing fluid through black heat-absorbing plates or pipes installed inside the chamber, so as to absorb solar energy. Examples include the solar hot water supply system disclosed in U.S. Pat. No. 4,418,685, the air ventilation facility disclosed in WO 9,625,632, the roof-style air ventilation facility disclosed in US No. 2002/0,032,000A1, and the wall-style air pre-heater disclosed in U.S. Pat. No. 4,934,338. However, the solar collectors used presently still have some drawbacks. Therefore, there is much room for improvements in applying and promoting the usage of solar energy to save energy and facilitate air conditioning. The aforementioned drawbacks include:

(1) The related solar collector is too heavy. Its long-term use may cause an overly heavy load on the bearing structure.

(2) Solar-thermo conversion efficiency may be limited.

(3) The structure of the related solar collector is complicated, which makes its installation and maintenance difficult. And thus prolongs the return period.

(4) The related solar heating device has poor compatibility and flexibility to match different bearing structures. Very often, it has to be custom-made.

(5) The contour of the solar collector is obtrusive and often impairs the aesthete and harmony of the overall appearance of the bearing structure.

(6) The packaging needed for the collector takes up much space and increases the cost of storage, display, and marketing.

(7) The integral assembly of the whole-unit product is bulky, making it difficult to use in large-area application and increases installation cost.

(8) Glass or transparent panels are glazed onto the outer frame of a heat-insulated chamber. Different thermal expansion coefficients of materials may cause thermal stress problems.

(9) The related design is so complicated as to be difficult for an untrained user to install.

(10) Some of the related designs can only be applicable to the structures which are under construction and designed to allow its installation. For most existing structures, the designs are unsuitable.

(11) When air passes over a glazed panel, heat is dissipated unless double-glazing is used, but it is expensive and troublesome.

(12) Hot water supply systems or liquid systems operated by solar heating experience problems due to freezing and leakage of the working liquid.

Related solar air conditioning apparatuses include that disclosed in U.S. Pat. No. 6,880,553. Heat-absorbing units of the solar air conditioning apparatus of U.S. Pat. No. 6,880,553 are connected in a fixed way, however it is difficult to extend the area of the solar air conditioning apparatus in a convenient way so that the solar air conditioning apparatus can be used in different applications.

It is therefore desirable to provide a solar air conditioning apparatus that can be flexibly extended and used in different applications.

SUMMARY OF THE INVENTION

The present invention relates to a solar air conditioning apparatus. A solar air conditioning apparatus includes an inlet assembly, an outlet assembly, a solar collector assembly, a plurality of connecting assemblies and a plurality of joining members. The solar collector assembly includes a plurality of parallel connected solar collectors which are disposed between inlet units of the inlet assembly and outlet units of the outlet assembly. The solar collector includes a plurality of series connected solar collecting units. The solar collecting unit has a bottom plate, a heat-absorbing plate disposed above the bottom plate, a brace plate integrally connecting the bottom plate with the heat-absorbing plate from a single piece, and a transparent panel disposed above the heat-absorbing plate. The bottom plate and the heat-absorbing plate respectively have first and second fastening structures and first and second clasping structures for joining the solar collecting units together. The connecting assemblies series connect the solar collecting units, the inlet units and the outlet units together. The joining members parallel connect adjacent inlet units and adjacent outlet units together.

Other advantages and novel features of the present invention will become more apparent from the following detailed description of preferred embodiment when taken in conjunction with the accompanying drawings.

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present device. Moreover, in the drawings, like reference numerals designate corresponding parts throughout the several views.

DETAILED DESCRIPTION OF THE INVENTION

Figure 1:
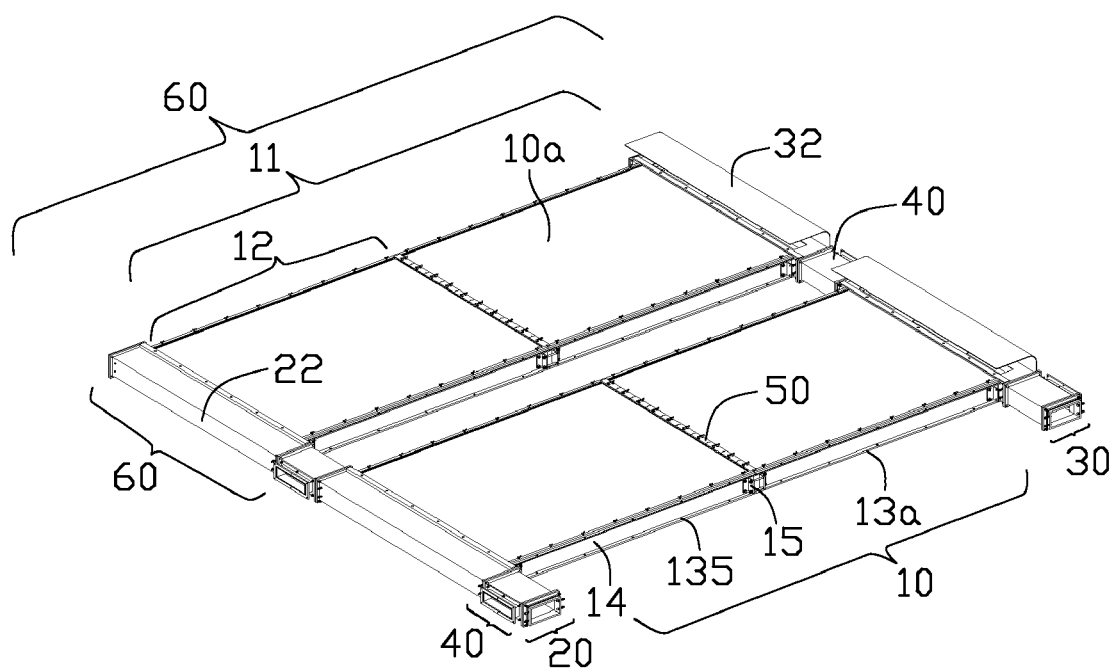
FIG. 1 is an assembled, schematic view of a solar air conditioning apparatus in accordance with a preferred embodiment of the present invention.
Figure 2:
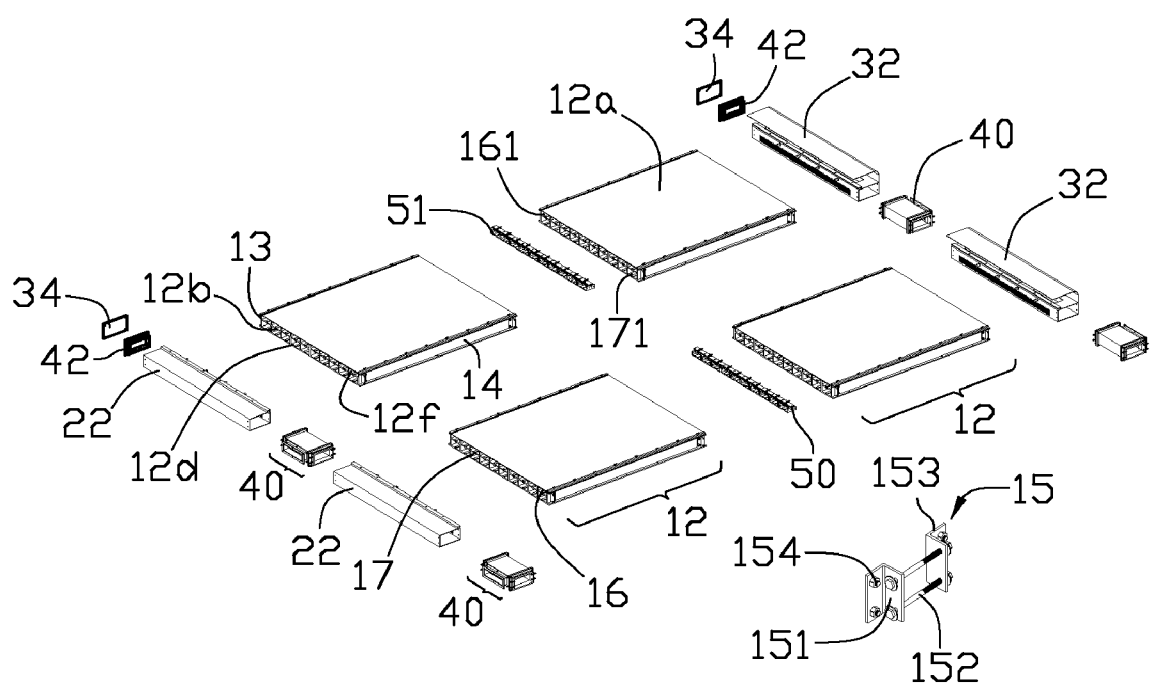
FIG. 2 is an exploded, schematic view of the solar air conditioning apparatus in FIG. 1.

Referring to FIGS. 1 and 2, a solar air conditioning apparatus in accordance with a preferred embodiment of the present invention is shown. The air conditioning device includes a solar collector assembly 10, and inlet and outlet assemblies 20, 30 respectively connected with entrances and exits of the solar collector assembly 10. The inlet assembly 20 communicates with a plurality of air-exhausting pipes (not shown) so as to induce stale indoor air into the solar collector assembly 10. The outlet assembly 30 communicates with outdoor environments so as to exhaust the stale indoor air to the outdoor environments.

The inlet assembly 20 includes a plurality of inlet units 22 which are parallel connected via a plurality of joining members 40 disposed therebetween. The outlet assembly 30 includes a plurality of outlet units 32 which are parallel connected in the same manner as the inlet units 22. Left and right ends of the inlet and outlet assemblies 20, 30 are hermetically sealed via a plurality of sealing plates 34. An inlet channel 26 (shown in FIG. 7) is formed in the inlet assembly 20 communicating with inner holes of the air-exhausting pipes, and an outlet channel 36 (shown in FIG. 8) is formed in the outlet assembly 30 communicating with the outdoor environments. The solar collector assembly 10 includes a plurality of parallel connected solar collectors 11 each of which includes a plurality of series connected solar collecting units 12. The solar collecting units 12 are connected together via a plurality of connecting assemblies 50 disposed therebetween. The inlet and outlet units 22, 32 are also connected to the solar collector 11 via the connecting assemblies 50. The solar collecting unit 12 has first and second supporting members 13, 14 arranged at left and right sides thereof. Connections between the solar collecting units 12 are strengthened via a plurality of fixing assemblies 15 fixed to the first and second supporting members 13, 14.

The fixing assembly 15 has two fixing elements 151 which are united together via a pair of blots 152. Each of the fixing elements 151 has an ear 153 defining a pair of through holes (not shown) therein. Blots 154 extend through the through holes of the fixing assembly 15 and through holes 137 of adjacent first supporting members 13 or through holes (not shown) of adjacent second supporting members 14, joining the adjacent first supporting members 13 or the adjacent second supporting members 14 together. Connections between the solar collector assembly 10 and the inlet and outlet assemblies 20, 30 are also strengthened via the fixing assemblies 15.

In the present air conditioning apparatus, the solar collecting units 12 are series assembled together to form the solar collector 11. The inlet and outlet units 22, 32 are series united to the solar collector 11 to form an air conditioning unit 60. Inlet units 22 and outlet units 32 of adjacent air conditioning units 60 are series connected so as to form the inlet assembly 20 and outlet assembly 30. Meanwhile, the air conditioning apparatus including a plurality of parallel connected solar collectors 11 and a plurality of series connected solar collecting units 12 are obtained.

Hereinafter shows series connections between two adjacent solar collecting units 12 which cooperatively form a solar collector 11, and parallel connections between two adjacent solar collectors 11 which cooperatively form a solar collector assembly 10. Actually, there can be more solar collecting units 12 cooperatively forming the solar collector 11, and more solar collectors 11 cooperatively forming the solar collector assembly 10. Therefore, an energy receiving surface 110a and a heat-absorbing surface 10b (shown in FIG. 3) for the solar air conditioning apparatus can be expanded as desirable.

Figure 3:
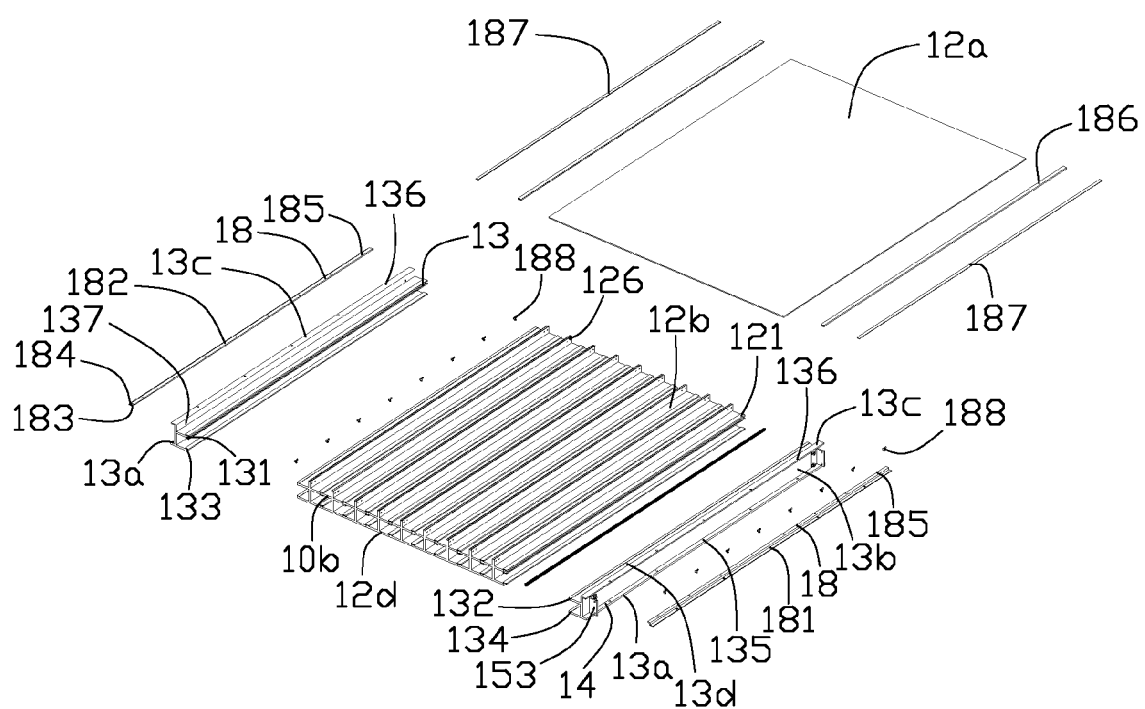
FIG. 3 is an exploded, schematic view of a solar collector of the solar air conditioning apparatus in FIG. 2.

Referring to FIGS. 2 and 3, each of the solar collecting units 12 includes a transparent panel 12a and a heat-absorbing set 12b located below the transparent panel 12a. The heat-absorbing set 12b is used for absorbing solar energy to heat air flowing therethrough. The heat-absorbing set 12b includes a plurality of modularized heat-absorbing units 12c which are clasped together. The heat-absorbing unit 12c is made of good thermal conductivity materials with black surface. The heat-absorbing units 12c are clasped together along a latitudinal direction and separate an inner space defined in the solar collector 11 into an upper heat-storage cavity 16 and a lower heat-absorbing cavity 17. A plurality of heat-storage channels 161 are defined in the heat-storage cavity 16, whilst a plurality of heat-absorbing channels 171 are defined in the heat-absorbing cavity 17. When the inlet and outlet units 22, 32 are assembled to the solar collector 11 to form the air conditioning unit 60, the heat-storage channels 161 are hermetically sealed, whilst entrance and exit of the heat-absorbing channels 171 respectively communicate with the inlet and outlet units 22, 32. The energy receiving surface 10a is formed on the heat-storage cavity 16, and the heat-absorbing surface 10b is formed in the heat-absorbing cavity 17.

Figure 4:
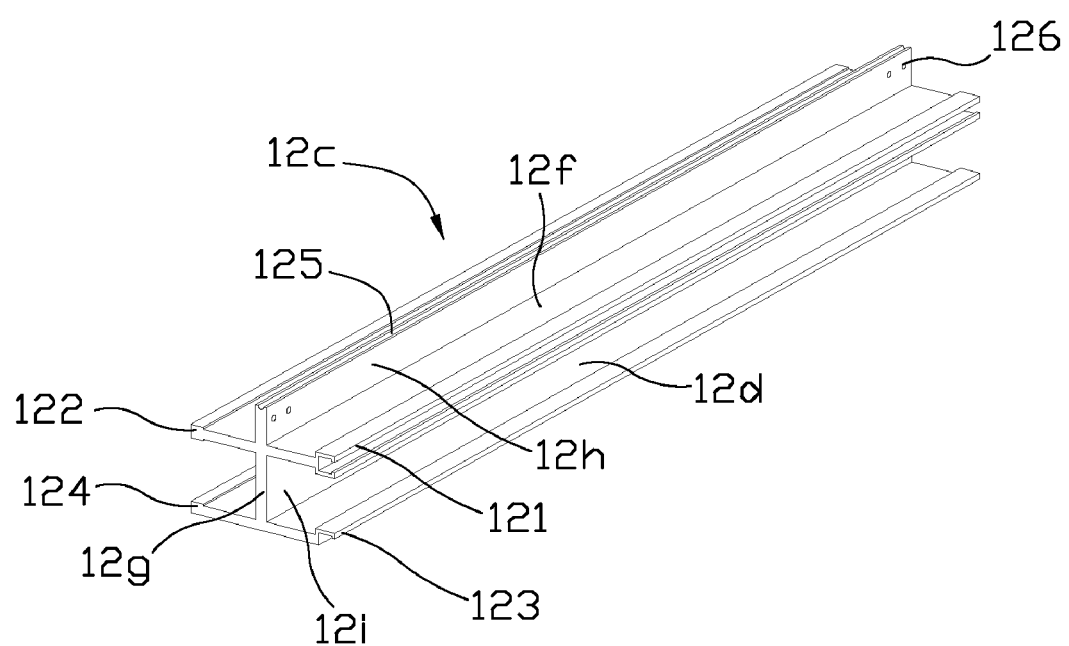
FIG. 4 is a schematic view of a heat-absorbing unit of the solar collector in FIG. 3.

Referring to FIG. 4, a heat-absorbing unit 12c of the solar collector 11 is shown. The heat-absorbing unit 12c includes an elongate bottom plate 12d, a heat-absorbing plate 12f above and parallel to the bottom plate 12d, and a brace plate 12g integrally connecting middle portions of the bottom plate 12d and the heat-absorbing plate 12f. The brace plate 12g has an upper portion 12h above the heat-absorbing plate 12f and a lower porting 12i below the heat-absorbing plate 12f. A height of the upper portion 12h of the brace plate 12g substantially equals to a height of the heat-storage cavity 16, whilst a height of the lower portion 12i of the brace plate 12g substantially equals to a height of the heat-absorbing cavity 17.

In order to unite the heat-absorbing units 12c together, first and second clasping structures 121, 122 are respectively formed at right and left ends of the heat-absorbing plate 12f, and first and second fastening structures 123, 124 are respectively formed at right and left ends of the bottom plate 12d. The heat-absorbing units 12c are assembled together via engagements between the first and second clasping structures 121, 122 and engagements between the first and second fastening structures 123, 124. The first and second clasping structures 121, 122, and the first and second fastening structures 123, 124 have configurations which complement with each other. The first clasping structure 121 is a substantially C-shaped groove, whilst the second clasping structure 122 is a clasping protrusion fitted in the C-shaped groove. The first fastening structure 123 is a substantially Γ-shaped groove, whilst the second fastening structure 124 is a fastening protrusion fitted in the Γ-shaped groove. The second clasping and fastening structures 122, 124 of a right heat-absorbing unit 12c are respectively engaged in the first clasping and fastening structures 121, 123 of a left heat-absorbing unit 12c, so that the left and right heat-absorbing units 12c are assembled together. The heat-absorbing unit 12c is made of thin plate and handy for being displayed, packaged, stored, transported and assembled.

Particularly referring to FIG. 3, the first and second supporting members 13, 14 each includes an elongate bottom base 13a, a supporting plate 13b perpendicularly and upwardly extending from a middle portion of the bottom base 13a, a supporting base 13c horizontally and outwardly extending from a top end of the supporting plate 13b, and a heat-absorbing plate 13d horizontally and inwardly extending from a middle portion of the supporting plate 13b. The bottom bases 13a of the first and second supporting members 13, 14 respectively define a plurality of mounting holes 135 in an outer side thereof, for mounting the solar collecting unit 12 onto a rooftop or a wall of a house, or an additional fixing board (not shown). The bottom bases 13a of the first and second supporting members 13, 14 respectively form the first and second fastening structures 133, 134, and the heat-absorbing plates 13d of the first and second supporting members 13, 14 respectively form the first and second clasping structures 131, 132 thereon. The first clasping and fastening structures 131, 133 of the first supporting plate 13b respectively engaged with the second clasping and fastening structures 122, 124 of an adjacent heat-absorbing unit 12c so that the first supporting member 13 is united to a left side of the heat-absorbing set 12b. The second clasping and fastening structures 132, 134 of the second supporting plate 13b respectively engaged with the first clasping and fastening structures 121, 123 of an adjacent heat-absorbing unit 12c so that the second supporting member 14 is united to a right side of the heat-absorbing set 12b.

The supporting bases 13c of the first and second supporting members 13, 14 respectively define a plurality of the mounting holes 136, corresponding to mounting holes 181 of a pair of supporting elements 18. Each of the supporting elements 18 includes a planar upper plate 182, a perpendicular plate 183 extending downwardly from the upper plate 182, and a lower plate 184 horizontally and outwardly extending from the perpendicular plate 183. The mounting holes 181 are defined in the lower plate 184 and a plurality of fixing holes 185 are defined in the upper plate 182. A plurality of blots 188 extend through the mounting holes 181 of the lower plates 184 of the supporting elements 18 and the mounting holes 136 of the supporting bases 13c of the first and second supporting members 13, 14, mounting the supporting elements 18 onto the first and second supporting members 13, 14. After the supporting elements 18 are mounted to the first and second supporting members 13, 14, two longitudinal slots (not shown) are formed between the upper plates 182 of the supporting elements 18 and the supporting bases 13c of the first and second supporting members 13, 14. The transparent panel 12a with two U-shaped cushions 186 attached to left and right sides thereof is inserted into the longitudinal slots. A pair of press bars 187 are inserted into the longitudinal slots and sandwiched between the upper plates 182 of the supporting elements 18 and the transparent panel 12a. A plurality of blots (not shown) are threaded into the upper plates 182 of the supporting elements 18 and urge the press bars 187 to move downwardly and have intimate contacts with the U-shaped cushions 186. The U-shaped cushions 186 are therefore intimately sandwiched between the upper plates 182 of the supporting elements 18 and the transparent panel 12a, hermetically sealing the left and right sides of the solar collecting unit 12.

Referring back to FIG. 4, a top end of the brace plate 12g of the heat-absorbing unit 12c defines an elongate slot 125 for receiving a soft cushion (not shown) between the heat-absorbing units 12c and the transparent panel 12a. The soft cushions are discretely distributed along longitudinal directions of the heat-absorbing plates 12f, for evenly supporting the transparent panel 12a on the heat-absorbing units 12c. A plurality of air gaps (not shown) are formed between the heat-absorbing units 12c and the transparent panel 12a at positions without the soft cushions. The air gaps communicate the heat-storage channels 161 with each other in such that air in the heat-storage cavity 16 is evenly heated and the heat transfer capability of the solar air conditioning apparatus is increased.

Figure 5:
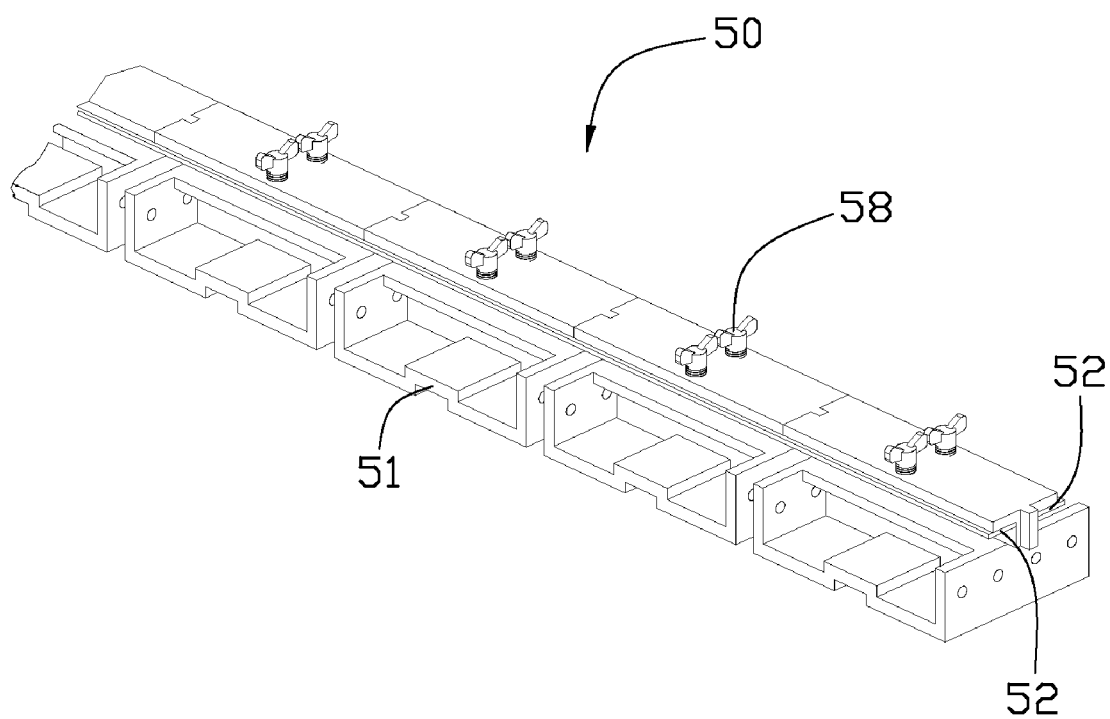
FIG. 5 is an assembled, schematic view of a connecting assembly of the solar air conditioning apparatus in FIG. 2.
Figure 6:
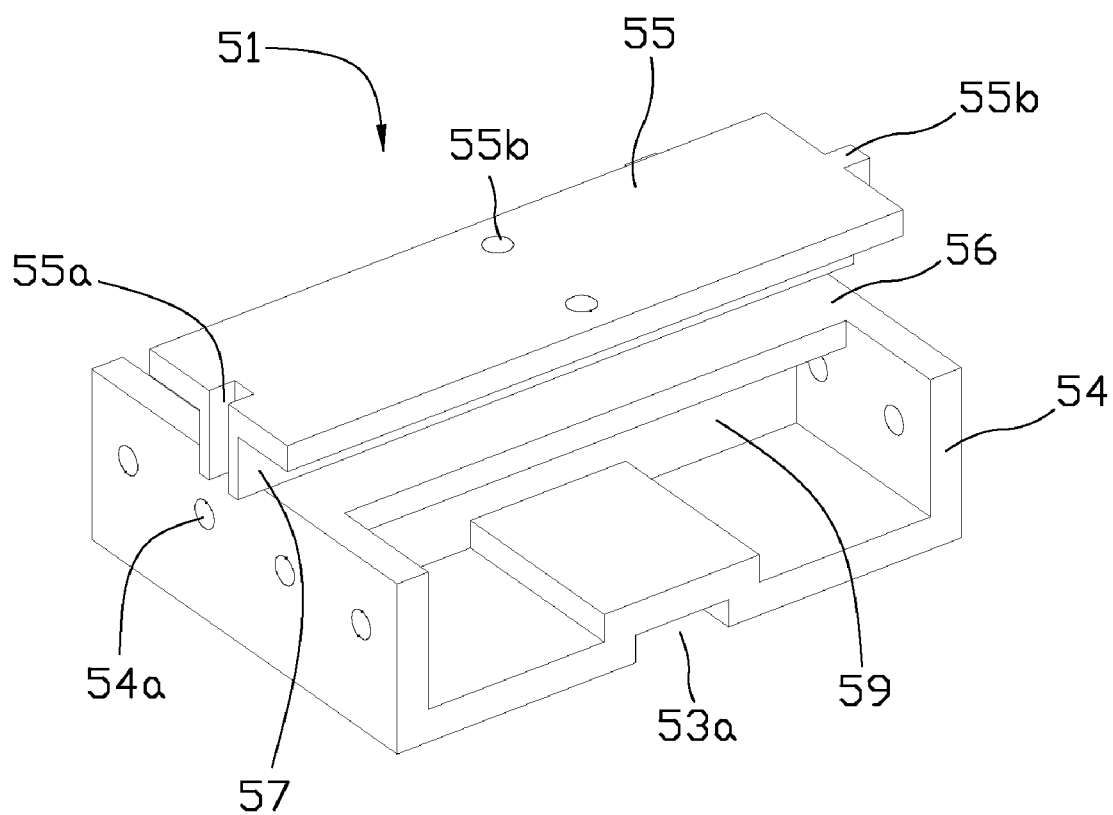
FIG. 6 is an exploded, schematic view of a connecting unit of the connecting assembly in FIG. 5.

Referring to FIGS. 5 and 6, the connecting assembly 50 includes a plurality of connecting units 51 and two steel bars 52. Each of the connecting units 51 is a single piece and includes a base plate 53, two joining plates 54 perpendicularly and upwardly extending from left and right ends of the base plate 53, and a top cover 55 spanning on the joining plates 54. The connecting unit 51 is connected to an adjacent connecting unit 51 and a heat-absorbing unit 12c sandwiched between them via blots (not shown) extending through installing holes 54a, 126 defined in the joining plates 54 of the connecting units 51 and the upper portion of the brace plate 12g of the heat-absorbing unit 12c. An integral of the base plate 53 and the joining plates 54 has a cross section which matches with a cross section of the heat-storage channel 161. A rectangular indent 53a is formed at a bottom surface of the base plate 53 of the connecting unit 51. The rectangular indent 53a has a configuration which matches with the assembled first and second clasping structures 121, 122, so that the bottom surface of the connecting unit 51 can hermetically contact with a top surface of the assembled first and second clasping structures 121, 122. The connecting unit 51 has two supporting arms 56 integrally connected between the joining plates 54, for supporting the transparent panel 12a. A supporting wall 57 is located between the supporting arms 56 and the top cover 55. A height of the supporting wall 57 provides a mounting height between the transparent panel 12a and the heat-absorbing unit 12c. The top cover 55 has a vertical indent 55a and an extrusion 55b, which matches with the vertical indent 55a, at left and right ends thereof. The extrusion 55b of a left connecting unit 51 is received in the vertical indent 55a of a right connecting unit 51, latitudinally orienting the adjacent connecting units 51. The top cover 55 further defines two thread holes 55b at a middle portion thereof.

In assembly of the solar collector 11, the connecting units 51 are inserted into the heat-storage channels 161 defined between the heat-absorbing units 12c, with outer surfaces of the connecting units 51 fitted with the heat-storage channels 161 and the installing holes 54a of the connecting units 51 aligning with the installing holes 126 of the heat-absorbing units 12c. A plurality of blots (not shown) extend through the installing holes 54a, 126 of the connecting units 51 and the heat-absorbing units 12c to thereby connecting the connecting units 51 and the heat-absorbing units 12c together. Then, the steel bars 52 and the transparent panels 12a with U-shaped cushions (not shown) arranged at front and rear ends thereof are inserted into two latitudinal slots formed between the top covers 55 and the supporting arms 56 of the connecting units 51. A plurality of blots 58 are threaded into the thread holes 55b of the top covers 55 of the connecting units 51, urging the steel bars 52 to move downwardly and have intimate contacts with the U-shaped cushions. The U-shaped cushions are therefore intimately sandwiched between the top covers 55 of the connecting units 51, the transparent panel 12a and the supporting arms 56 of the connecting units 51, hermetically sealing the front and rear ends of the solar collector 11.

Referring to FIG. 6, the connecting unit 51 has a partition plate 59 below the supporting arms 56 and integrally connecting the supporting arms 56 with a middle portion of the base plate 53. When components of the solar air conditioning apparatus are assembled, the partition plates 59 separate the heat-storage cavities 16 of the adjacent front and rear solar collecting units 12 from each other. Alternatively, the partition plates 29 can also be canceled or be cut through so that the heat-storage cavities 16 of the adjacent front and rear solar collecting units 12 can communicate with each other.

Figure 7:
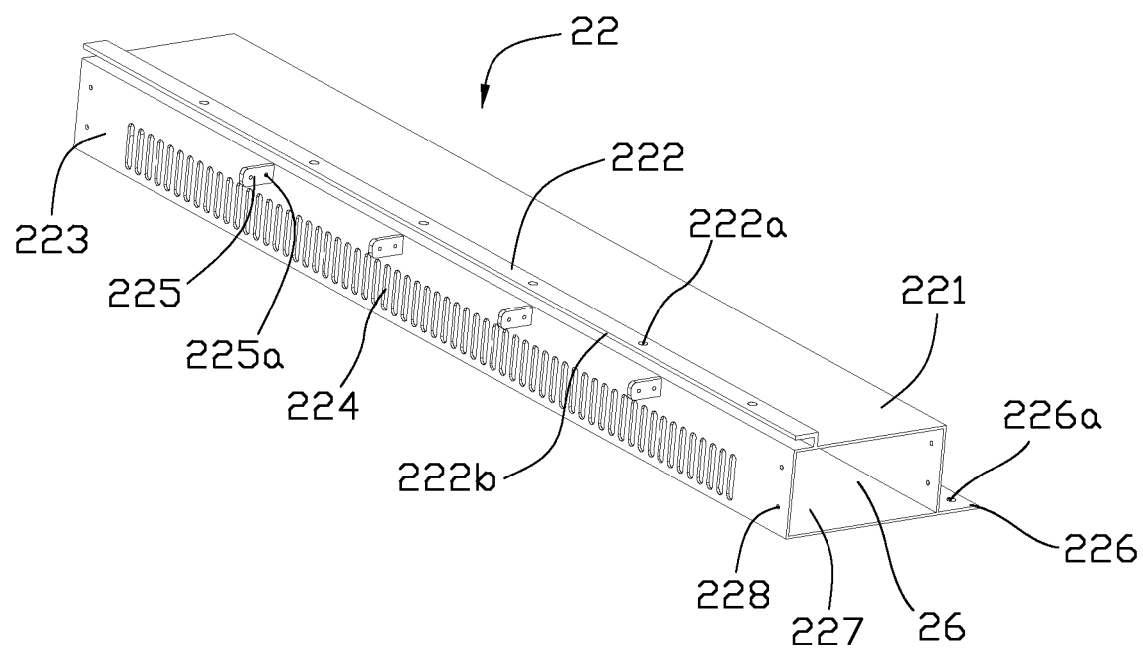
FIG. 7 is a schematic view of an inlet unit of an inlet assembly of the solar air conditioning apparatus in FIG. 1, but viewed from different aspect.
Figure 8:
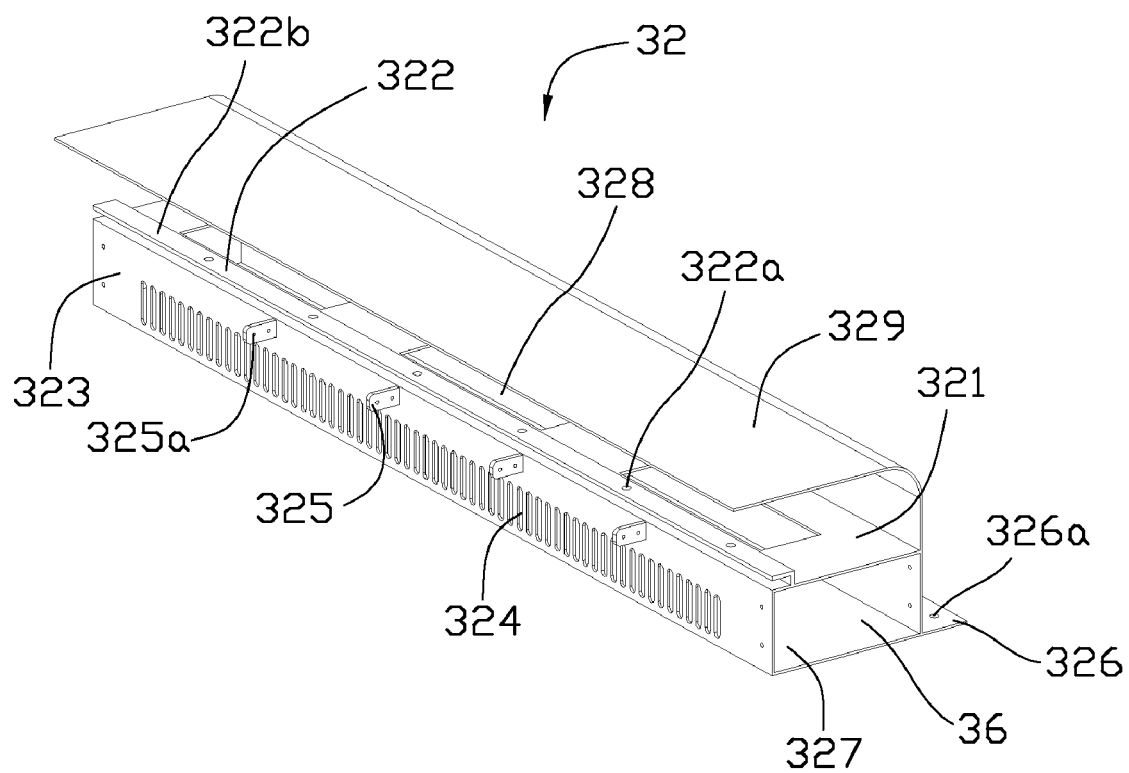
FIG. 8 is a schematic view of an outlet unit of an outlet assembly of the solar air conditioning apparatus in FIG. 1.
Figure 9:
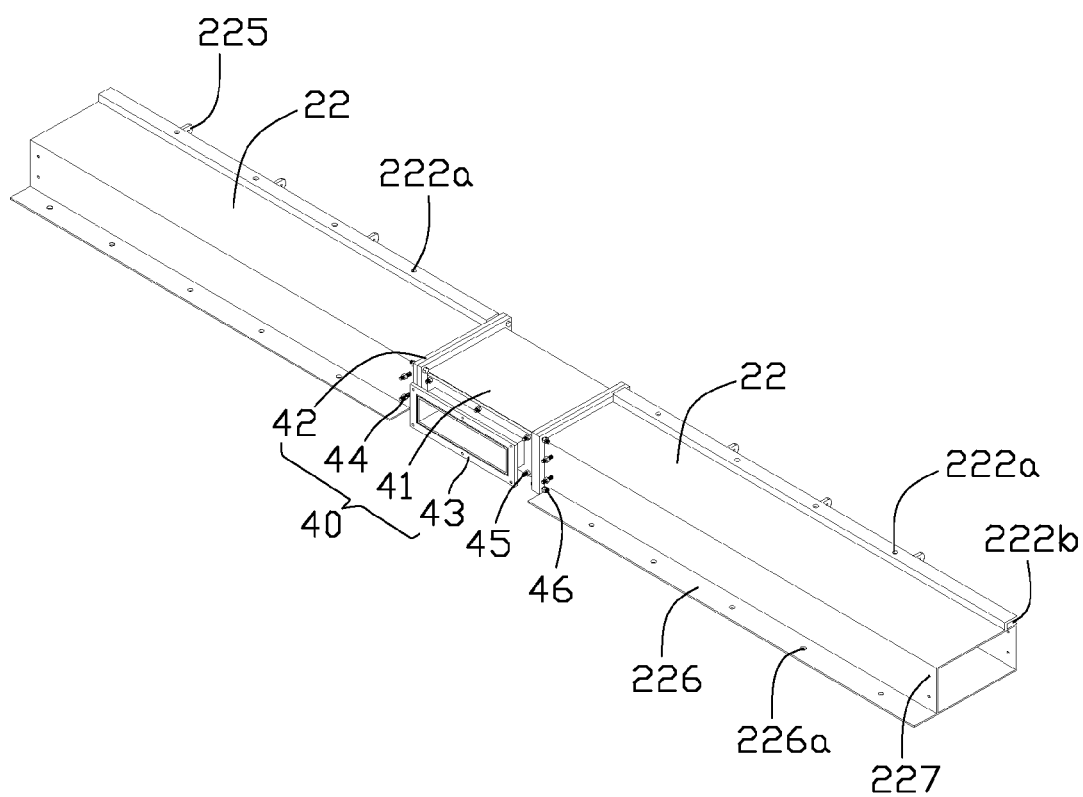
FIG. 9 is an assembled, schematic view of the inlet assembly of the solar air conditioning apparatus in FIG. 1.
Figure 10:
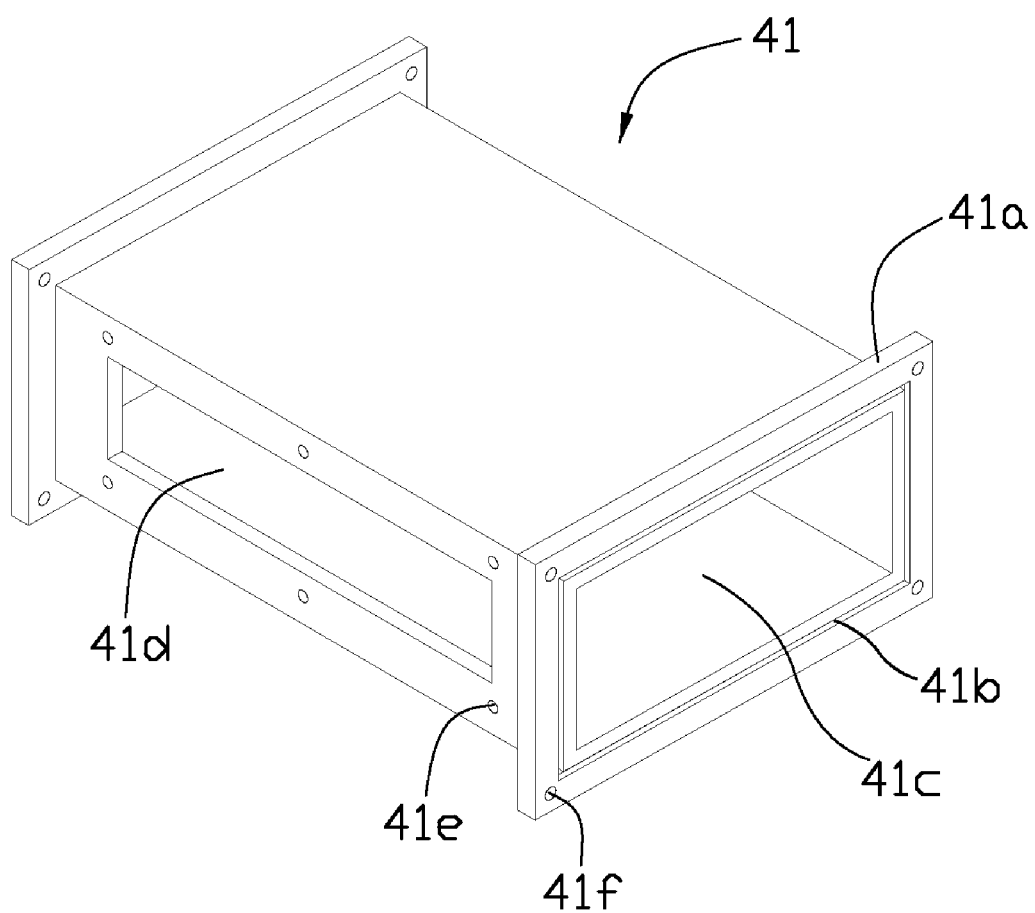
FIG. 10 is an assembled, schematic view of a joining member of the solar air conditioning apparatus in FIG. 1.
Figure 11:
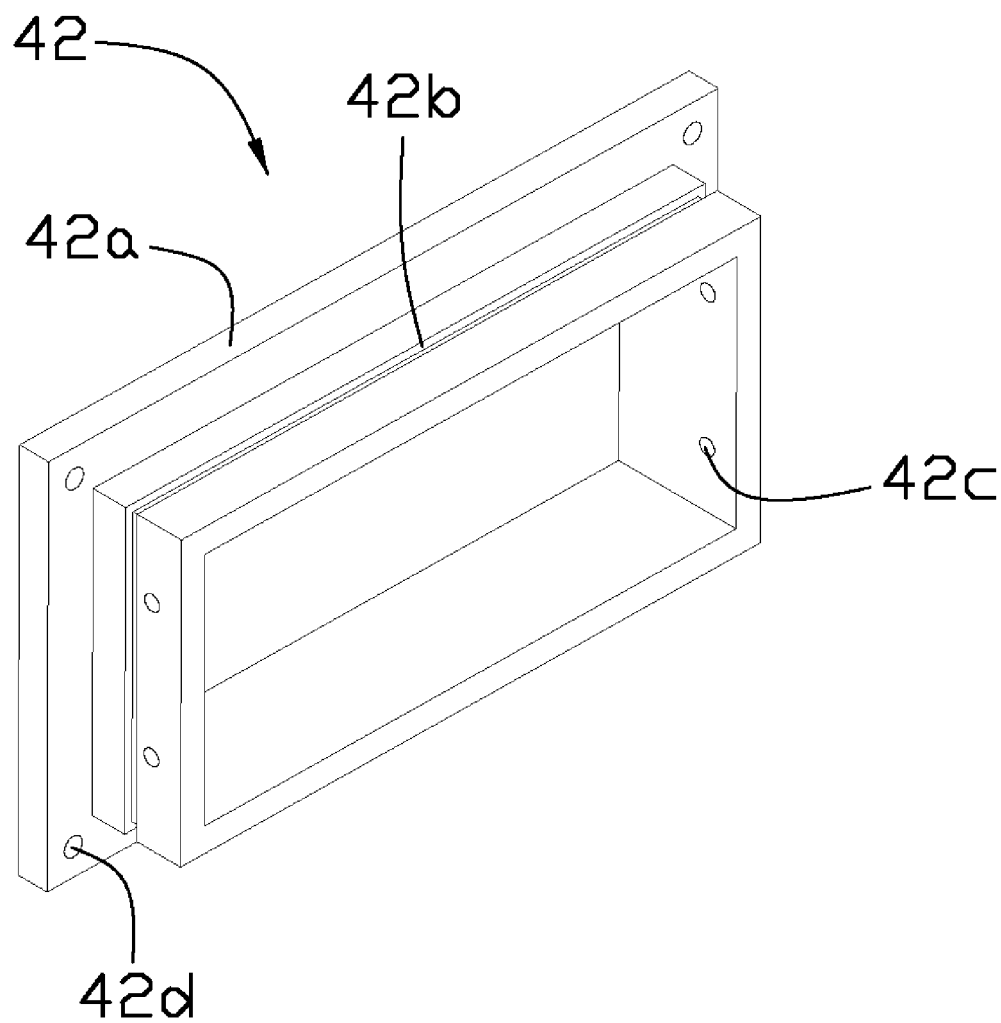
FIG. 11 is a schematic view of a first joint of the joining member of the solar air conditioning apparatus in FIG. 10.
Figure 12:
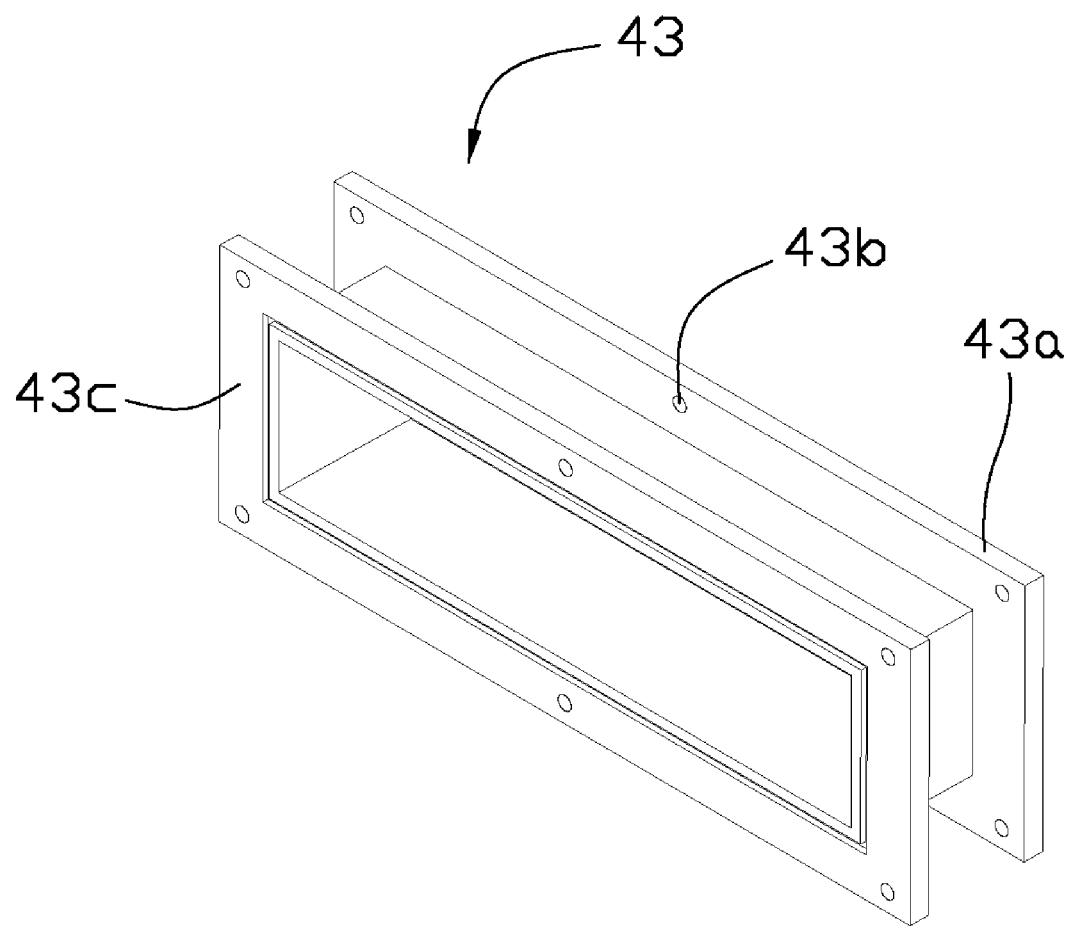
FIG. 12 is a schematic view of a second joint of the joining member of the solar air conditioning apparatus in FIG. 10.

Referring to FIGS. 7 and 8, the inlet and outlet units 22, 32 of the present solar air conditioning apparatus are shown. The inlet unit 22 includes a hollow rectangular shaped housing 221, an L-shaped baffle 222 extending from a top surface at a position adjacent to a rear side of the housing 221. A plurality of thread holes 222a are defined in a top surface of the baffle 222. A receiving slot 222b is formed between the top surface of the housing 221 and the baffle 222, hermetically receiving the front end of a transparent panel 12a of a front-most solar collecting unit 12 therein. The housing 221 includes a rearmost spacing plate 223 which defines a plurality of air passages 224 at a bottom portion thereof. The air passages 224 are separated from each other and are evenly distributed in the spacing plate 223. Four fixing plates 225 with mounting holes 225a are perpendicularly arranged on the spacing plate 223. A plurality of screws (not shown) extend through the mounting holes 225a of the fixing plates 225 of the inlet unit 22 and front installing holes 126 of the front-most solar collecting unit 12, fixing the inlet unit 22 and the solar collecting unit 12 together. The housing 221 of the inlet unit 22 further includes a fixing arm 226 horizontally and upwardly extending from a bottom end of a front side thereof. The fixing arm 226 defines a plurality of fixing holes 226a therein, for mounting the solar collecting unit 12 onto the rooftop and the wall of the house, and the fixing board. The housing 221 of the inlet unit 22 defines two hatches 227 at left and right sides so as to form the inlet channel 26 in the inlet assembly 20.

The outlet assembly 30 has similar housing 321, baffle 322, thread holes 322a, receiving slot 322b, spacing plate 323, air passages 324, fixing plates 325, mounting holes 325a, fixing arm 326, fixing holes 326a, and hatches 327 to the inlet unit 22. The difference between the inlet unit 22 and the outlet unit 32 is: a top surface of the housing 321 of the outlet unit 32 defines three spaced openings 328 therein, communicating an inner space of the outlet unit 32 to the outdoor environments. The outlet unit 32 has a substantially L-shaped rain cover 329 extending from a front end of a top surface of the housing 321 so as to cover the openings 328 of the housing 321. Furthermore, a plurality of defenses (not shown) can be disposed on the housing 321, for preventing irritants and pollutants such as, dust or mosquitoes from entering into the housing 321 of the outlet unit 32.

When the inlet and outlet units 22, 32 are assembled to the solar collector 11, top portions of the spacing plates 223, 323 of the inlet and outlet units 22, 32 hermetically seal front and rear ends of the heat-storage cavity 16 of the solar collecting unit 12, whilst the air passages 224, 324 of the inlet and outlet units 22, 32 communicate with the heat-absorbing cavity 17 of the solar collecting unit 12. Therefore, the stale indoor air evenly enters into the heat-absorbing cavity 17 and increases heat-absorbing efficiency of the solar air conditioning apparatus. In order to decrease air resistance, a total area of the air passages 224, 324 is preferably twice as large as a cross-sectional area of an inner hole of the air-exhausting pipe.

Referring to FIGS. 9 through 12, the joining member 40 includes a connecting joint 41, two first joints 42 arranged at left and right sides of the connecting joint 41, and a second joint 43 arranged at a front side of the connecting joint 41. The connecting joint 41 has an inner channel 41c extending from the left side to the right side thereof, communicating the inlet channels 26 of the inlet units 22 with each other. The connecting joint 41 further has two flanges 41a at the left and right sides thereof, for connecting with flanges 42a of the first joints 42 via screws 46 extending through mounting holes 41f, 42d of the flanges 41a, 42a of the connecting joint 41 and the first joint 42. A first rectangular groove 41b is defined between joining surfaces of the connecting joint 41 and the first joint 42. The first rectangular groove 41b receives a rectangular cushion (not shown) or an O-ring (not shown) therein, hermetically sealing the joining surfaces of the connecting joint 41 and the first joint 42. The first joint 42 defines a second rectangular groove 42b therein, for receiving a rectangular cushion (not shown) or an O-ring (not shown) to hermetically sealing joining surfaces of the first joint 42 and an adjacent inlet unit 22. The first joint 42 is fixed to the adjacent inlet unit 22 via screws 44 extending through fixing holes 42c, 228 defined in the first joint 42 and the inlet unit 22. The connecting joint 41 defines a rectangular aperture 41d at the rear side and a plurality of fixing holes 41e around the rectangular aperture 41d. A plurality of screws 45 extend through the fixing holes 41e of the connecting joint 41 and fixing holes 43b of a first flange 43a of the second joint 43, uniting the second joint 43 unto the connecting joint 41. The second joint 43 has a second flange 43c at an opposite side thereof, for connecting the second joint 43 of the joining member 40 to the air-exhausting pipe. The air-exhausting pipes connected with the joining members 40 are arranged at different portions of the house so that the stale indoor air from different portions of the house is induced to the heat-absorbing channels 171 of the solar collector assembly 10 to be heated, which increases heat-absorbing efficiency of the solar air conditioning apparatus. Similarly, the outlet unit 32 is connected with the joining member 40 in the same manner and the first joints 42 at the right-most and left-most sides are sealing via the sealing plates 34.

Figure 13:
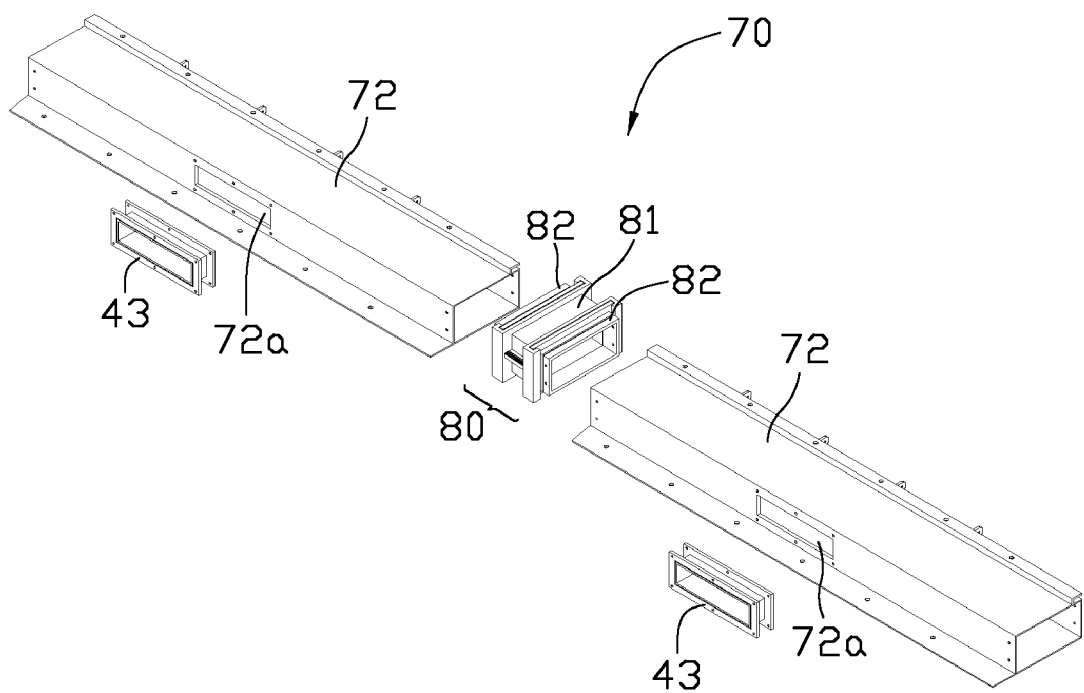
FIG. 13 is an exploded, schematic view of an inlet assembly of a solar air conditioning apparatus according to a second embodiment of the present invention.
Figure 14:
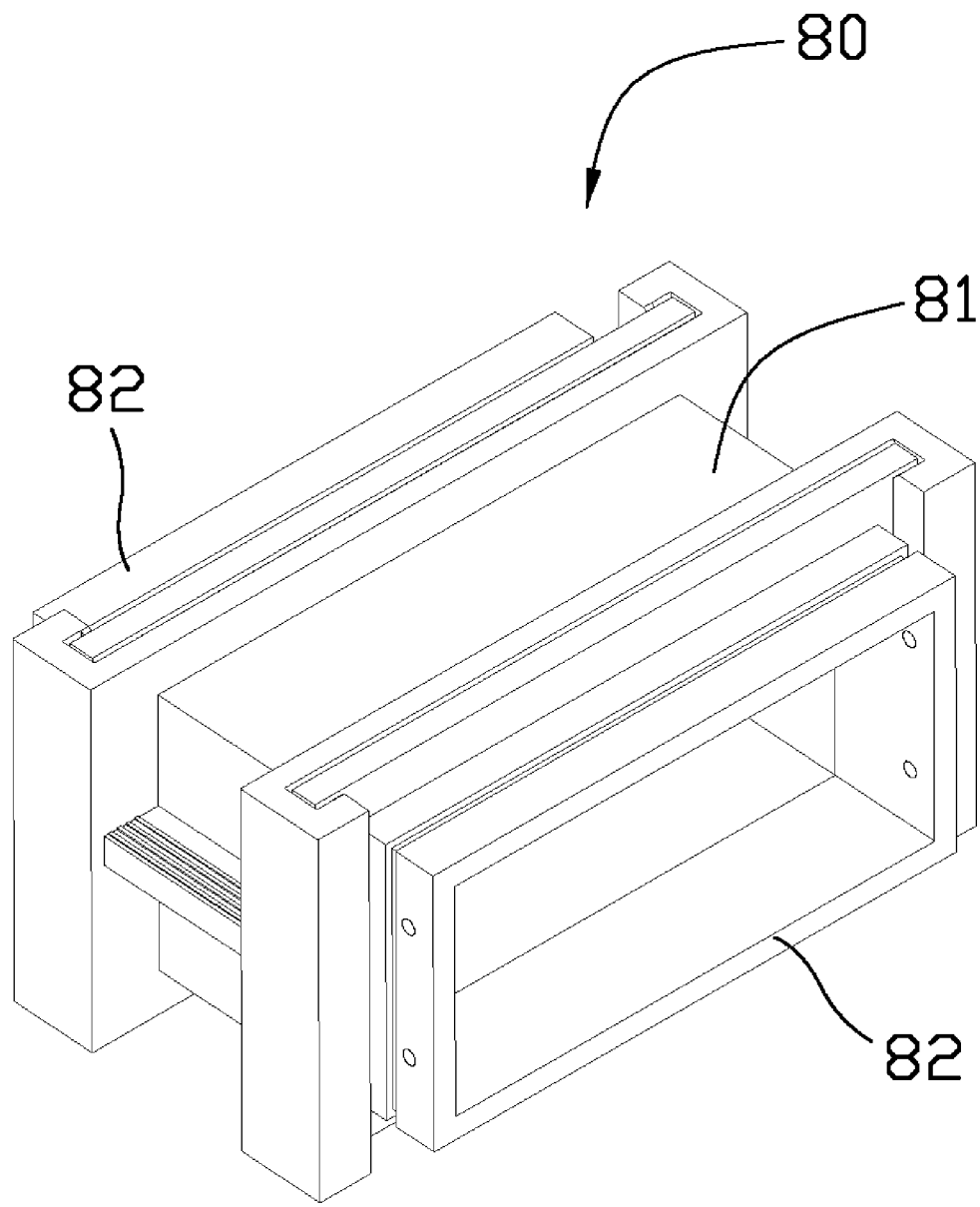
FIG. 14 is an assembled, schematic view of a joining member of the solar air conditioning apparatus in FIG. 13.
Figure 15:
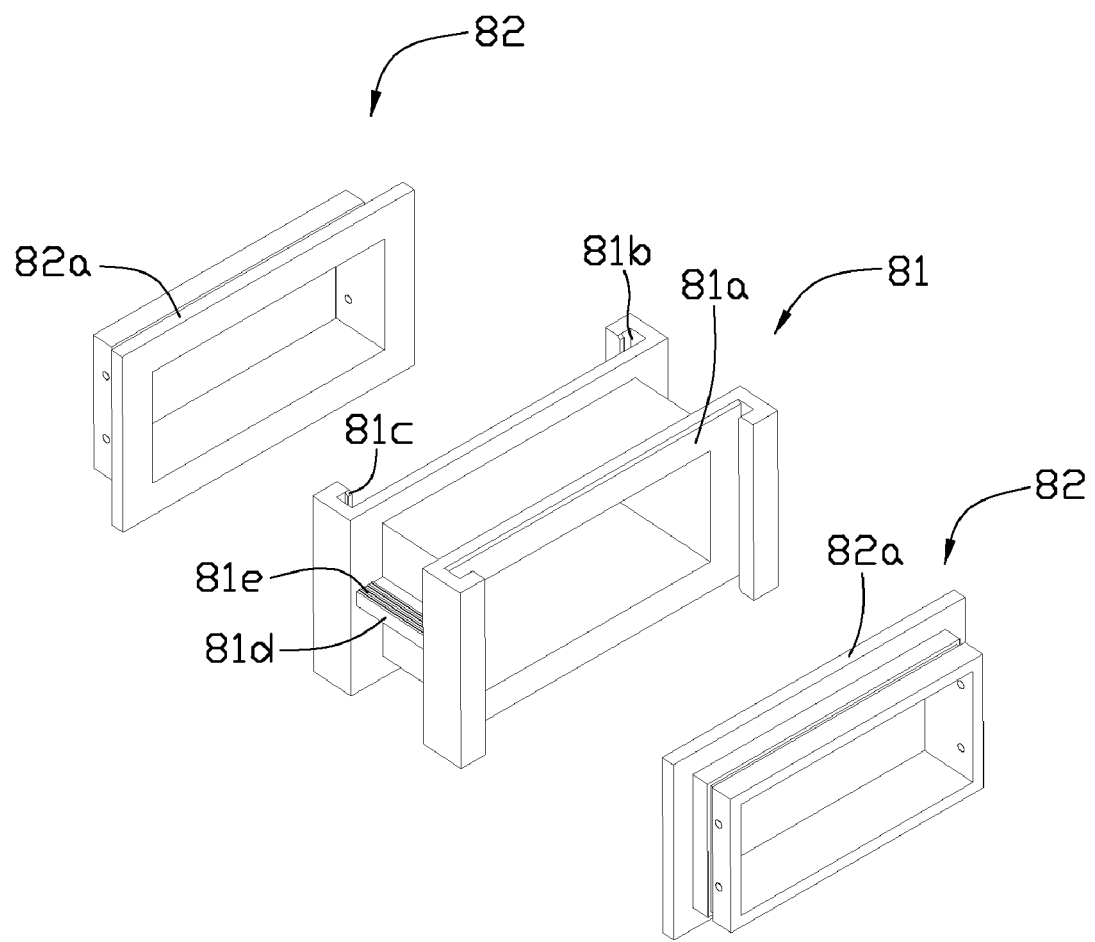
FIG. 15 is an exploded, schematic view of the joining member of the solar air conditioning apparatus in FIG. 13.

Referring to FIGS. 13 and 14, an inlet assembly 70 of a second embodiment of the present solar air conditioning apparatus and a joining member 80 of this embodiment are shown. Differences between the second embodiment and the first embodiment are shown as below. In this embodiment, each of the inlet units 72 defines a rectangular aperture 72a at a middle portion of a front side thereof, for communicating with a corresponding second joint 43. The joining member 80 includes a connecting joint 81 and two first joints 82 arranged at left and right sides of the connecting joint 81. The first joint 82 has similar size and configuration to the first joint 42 of the joining member 40 of the first embodiment. However, the first joint 82 does not define mounting holes in the flange 81a. The flanges 82a of the first joints 82 are inserted into receiving channels 81b defined in the left and right sides of the connecting joint 81. The connecting joint 81 has extrusion strips 81c extending into the receiving channels 81b. The first joints 82 are hermetically connected to the connecting joint 81 via deformations of the extrusion strips 81c which are generated under pressures between the extrusion strips 81c and the flanges 82a of the first joints 82. Therefore, the first joints 82 can be rapidly assembled to and disassembled from the connecting joint 81. In order to assemble and disassemble the first joints 82, the connecting joint 81 forms two pressing portions 81d at front and rear sides and a plurality of anti-slip strips 81e on the pressing portions 81d.

In summer, the solar air conditioning apparatus can heat the stale indoor air guided from the air-exhausting pipes and expel the heated stale indoor air out of the housing thermal buoyancy effect. At the same time, cool and fresh outdoor air can be guided into the house, or the outdoor air can be cooled and guided into the house through other devices (not shown) or channels (not shown). Thus, in summer, air in the house can be kept fresh and cool all the time.

In winter, air through the air-exhausting pipes can be heated in the solar collector assembly 10 of the solar air conditioning apparatus and guided back to the house via a fan (not shown) connected with the air-exhausting pipes. Furthermore, when the fresh outdoor air is guided to mix with air in the air-exhausting pipes and further heated in the solar collector assembly 10, the inlet assembly 20 should communicate with the air-exhausting pipes and air openings of the house should be opened. The fan draws the fresh outdoor air through the solar air conditioning apparatus to the house.

The solar air conditioning apparatus can be installed with a hot water supply system (not shown) which can operate year-round. A plurality of heat-absorbing water pipes (not shown) are arranged in the heat-storage cavities of the solar air conditioning apparatus, then heated water is transferred back to a water circulation circuit (not shown) including a heat storage tank (not shown). Meanwhile, air is heated in the heat-absorbing channels 171 of the solar air conditioning apparatus.

The solar air conditioning apparatus continuously induces the stale indoor air to evenly enter into the heat-absorbing channels 171 of the heat-absorbing cavity 17 through the inlet assembly 20. The stale indoor air is heated in the heat-absorbing cavity 17 and is exhausted out of the house under thermal buoyancy effect. Meanwhile, the fresh outdoor air is induced into the house. The solar air conditioning apparatus is therefore good for health, for energy saving and for environmental protection.

In the present solar air conditioning apparatus, the solar collecting units 12 are series joined to form the solar collector 11 via the connecting assemblies 50 and the solar collectors 111 are parallel connected to from the solar collector assembly 10 via the joining members 40. Therefore, the solar air conditioning apparatus can be flexibly expanded as desired to most optimal absorption surface area to fully absorb and collect solar energy, which strengthens the thermal buoyancy effect of the solar air conditioning apparatus. Air circulation in the solar air conditioning apparatus is therefore improved due to the strengthened thermal buoyancy effect. Furthermore, the solar collecting units 12, the inlet and outlet units 22, 32, and other individual components of the solar air conditioning apparatus can be separately assembled together, which simplifies the assembly and further decreases the assembly cost of the solar air conditioning apparatus. In addition, the solar collector assembly 10 can be divided into many pieces, which can be individually repaired. Thus, the reparation of the solar air conditioning apparatus is simplified and the reparation cost of the solar air conditioning apparatus is decreased. Moreover, although the solar air conditioning apparatus only has one layer of transparent panel 12a in its structure, because most air goes through the lower heat-absorbing cavity 17, the solar air conditioning apparatus has the excellent insulation effect of a double-glazed system and very high heat-absorption efficiency.

The solar air conditioning apparatus is designed according to a modular concept. Cost of the solar air conditioning apparatus is greatly reduced because the components are made of thin boards and plates, and are suitable for mass-production. The solar air conditioning apparatus is much simpler than related assemblies with whole-unit designs. The assembly not only saves expenses in packaging but also requires less room for display and storage to make channel marketing much easier. The solar air conditioning apparatus is very easy to install and maintain such a system. Moreover, users can install and assemble the system by themselves.

All in all, the solar air conditioning apparatus is a passive environmental protection air conditioner which is driven by solar energy. There is no need to consume electric energy, and no noise are generated by a compressor and no environmental destroy are caused by refrigerant. The solar air conditioning apparatus exhausts the stale indoor air out of the house and induces the fresh outdoor air into the house. Therefore, the quality of the indoor air is improved and a comfortable feeling is obtained. Moreover, the modularized components benefit the solar air conditioning apparatus for being displayed, packaged, stored, transported and assembled. Furthermore, the components of the solar air conditioning apparatus are thin and are handy for DIY assembly, which fits for the environmental protection and DIY trends.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A solar air conditioning apparatus comprising:
an inlet assembly comprising a plurality of inlet units;
an outlet assembly comprising a plurality of outlet units;

a solar collector assembly comprising a plurality of parallel connected solar collectors, the solar collector being disposed between corresponding inlet and outlet units and comprising a plurality of series connected solar collecting units, each of the solar collecting units having a bottom plate, a heat-absorbing plate disposed above the bottom plate, a brace plate integrally connecting the bottom plate having a first fastening structure at a first lateral end of the bottom plate with the heat-absorbing plate from a single piece, and a transparent panel disposed above the heat-absorbing plate, the bottom plate and the heat-absorbing plate respectively having a second fastening structures at a first lateral end of the heat-absorbing plate, the bottom plate further having a first clasping structure at a second lateral end of the bottom plate and the heat-absorbing having a second clasping structure at a second lateral end of the heat-absorbing plate, the first and second fastening structures and the first and second clasping structures for joining the solar collecting units together;

a plurality of connecting assemblies, separate from the solar collecting units, series connecting the solar collecting units, the inlet units and the outlet units together; and a plurality of joining members, separate from the inlet and outlet units, parallel connecting adjacent inlet units and adjacent outlet units together.

2. The solar air conditioning apparatus as claimed in claim 1, wherein the heat-absorbing plates dividing an inner space of the solar collector into an upper heat-storage cavity and a lower heat-absorbing cavity, the inlet and outlet units sealing two ends of the upper heat-storage cavity and communicating with two ends of the lower heat-absorbing cavity.

3. The solar air conditioning apparatus as claimed in claim 1, wherein the first fastening structure is a Γ-shaped groove, and the second fastening structure is a fastening protrusion fitted in the Γ-shaped groove.

4. The solar air conditioning apparatus as claimed in claim 1, wherein the first clasping structure is a C-shaped groove, and the second clasping is a clasping protrusion fitted in the C-shaped groove.

5. The solar air conditioning apparatus as claimed in claim 1, wherein the solar collecting unit comprises first and second supporting members at opposite sides thereof, the first supporting member having a first clasping structure engaged with the second clasping structure of an adjacent heat-absorbing plate of the heat-absorbing unit, the second supporting member having a second clasping structure engaged with the first structure of an adjacent heat-absorbing plate of the heat-absorbing unit.

6. The solar air conditioning apparatus as claimed in claim 5, wherein the first and second supporting members respectively have a bottom base connected with an outermost bottom plate of the solar collecting unit, and a supporting base connected with a lower plate of a supporting element, the transparent panel being sandwiched between an upper plate of the supporting element and the supporting base.

7. The solar air conditioning apparatus as claimed in claim 5, further comprising a plurality of fixing assemblies each of which comprises two ears, the ears of the fixing assemblies being respectively fixed to adjacent solar collecting units, adjacent inlet unit and solar collecting unit, and adjacent solar collecting unit and outlet unit, joining the inlet unit, the outlet unit and the solar collecting units together.

8. The solar air conditioning apparatus as claimed in claim 1, wherein each of the connecting assemblies comprises a plurality of connecting units, the connecting units being disposed between adjacent solar collecting units, adjacent inlet unit and solar collecting unit, and adjacent solar collecting unit and outlet inlet, joining the inlet unit, the outlet unit and the solar collecting units together.

9. The solar air conditioning apparatus as claimed in claim 8, wherein the connecting unit comprises a base plate and two joining plates extending from the base plate, the brace plate of the heat-absorbing unit being sandwiched between the joining plates of adjacent connecting units.

10. The solar air conditioning apparatus as claimed in claim 9, wherein the connecting units being positioned on the heat-absorbing plates of the heat-absorbing units, the base plate of each of the connecting units having an indent for receiving clasped first and second clasping structures.

11. The solar air conditioning apparatus as claimed in claim 9, wherein the connecting unit further comprises two supporting arms connected with the joining plates, a top cover on the supporting arms, and a supporting wall between the supporting arms and the top cover, two latitudinal slots being formed between the supporting arms, the supporting wall and the top cover, receiving the transparent panel therein.

12. The solar air conditioning apparatus as claimed in claim 1, wherein the top cover has an indent and an extrusion at opposite ends thereof, the extrusion of a rear connecting unit being received in the indent of a front connecting unit.

13. The solar air conditioning apparatus as claimed in claim 11, wherein the top cover defines thread holes therein, for extending blots therethrough to urge the transparent panel towards the supporting arms.

14. The solar air conditioning apparatus as claimed in claim 1, wherein the joining member comprises a connecting joint, two first joints fixed to the connecting joint for connecting the connecting joint with adjacent inlet units, and a second joint connecting the connecting joint with an air-exhaust pipe.

15. The solar air conditioning apparatus as claimed in claim 1, wherein the joining member comprises a connecting joint, two joints clasped with the connecting joint for connecting the connecting joint with adjacent inlet units, each of the inlet units defining an aperture aligning with an inner hole of an air-exhaust pipe.

\* \* \* \* \*